April 20, 1943. K. J. EBERHARDT 2,317,264
MACHINE TOOL
Filed Sept. 29, 1939 6 Sheets-Sheet 1

Fig. 1

INVENTOR.
KARL J. EBERHARDT
BY
Kwis Hudson & Kent
ATTORNEYS

Fig. 10

UNITED STATES PATENT OFFICE 2,317,264

MACHINE TOOL

Karl J. Eberhardt, Cleveland, Ohio, assignor to
The Warner & Swasey Company, Cleveland,
Ohio, a corporation of Ohio Application September 29, 1939, Serial No. 297,099

22 Claims. (Cl. 29—64)

This invention relates to a machine tool and particularly to mechanism for selecting or preselecting the rates of movement of a movable part or parts of the machine and for effecting a change of the rates of movement thereof to the selected or preselected rates.

Inasmuch as the selecting or preselecting mechanism embodying the invention has particular utility when applied to a cross-slide carriage or to a turret slide of a machine tool for controlling the rates of feeding movements of such slides it is so illustrated and described herein, but it should be understood that it could be utilized for controlling the rates of movement of other movable parts of a machine tool, as for example the work spindle.

An object of the invention is to provide a mechanism for selecting or preselecting the different rates of movement of a movable part of a machine tool and which mechanism includes movable and indexible members, together with a control lever operatively associated with said members in such manner that the movement of the lever in one direction first effects a movement of said members from an indexible position into a position to effect a rate change to a selected or preselected rate and then effects a movement of said members back to the indexible position.

Another object of the invention is to provide in a machine tool having a part movable at different rates of movement and wherein a control lever is employed to connect and disconnect such part to or from a power source, mechanism for selecting or preselecting the different rates of movement of said part and including movable and indexible members, said mechanism being operatively associated with said lever such that movement of said lever in one direction first moves said members from an indexible position into a position that effects a rate change to the selected or preselected rate, then moves said members back to the indexible position and finally effects a connection of said part to said power source, the movement of said control lever in the opposite direction effecting a disconnection of said part from said power source.

Another object of the invention is to provide in a machine tool having a movable part which is given different rates of movement and wherein a control lever is employed to connect and disconnect said part to and from a power source, mechanism operatively associated with the drive for said part and with said lever for selecting or preselecting the different rates of movement of said part and which includes members indexible to select or preselect said different rates of movement and movable toward each other to obtain the selected or preselected rate and from each other to a position wherein they may be indexed, the operative association between said mechanism and said lever being such that movement of said lever in one direction first moves said members toward each other, then effects a movement of said members away from each other, and then effects a connection of the power source to said part.

Another object of the invention is to provide in a machine tool having a movable part which is given different rates of movement and wherein a control lever is employed to connect and disconnect said part to or from a power source, mechanism that is operatively associated with the drive for said part and with said lever for selecting or preselecting the different rates of movement of said part and which includes members rotatable to index the same and slidable toward and from each other away from and to an indexible position, the operative association between said mechanism and said lever being such that movement of said lever in one direction first slides said members toward each other and away from the indexible position to effect a rate change to the selected or preselected rate, then effects a sliding movement of said members away from each other and back to the indexible position, and then effects a connection of the power source to said part.

A still further object is to provide mechanism for selecting or preselecting the different feeding movements of a slide of a machine tool and which is of such character that it can be mounted on the front face of the apron of the slide in a position wherein it will not interfere with the movement of the slide or with the movement of any other slide or with the operation of the cutting tools carried by said slides.

A further object of the invention is to provide in a machine tool having a slide which is given different rates of feeding movement by means of drive train and which can be connected or disconnected to or from a power source by means of a control lever, mechanism operatively associated with said control lever for selecting or preselecting the different rates of feeding movement of the slide and including movable and indexible members so arranged and so connected with said lever that when the latter is positioned either to connect or disconnect the power source to or from said slide said members may be indexed.

A still further object is to provide in a machine tool having a compound slide, one element of which is given a power feeding movement by means of a feed drive train and another element of which is given an independent power feeding movement by means of a feed drive train, mechanism for selecting or preselecting either a rate of feeding movement for said first element or a rate of feeding movement for said second element and including members indexible to select or preselect the different rates of feeding movement for said elements and movable from an indexible position to a position that effects a change to the selected or preselected rates, together with a pair of levers which control the connection and disconnection to a power source of the respective feed drive trains, and means operatively associating said levers and said members such that movement of one or the other of said levers in a single direction first moves said members from an indexible position into a position that effects the rate change, then back to the indexible position, and then effects a connection of the respective feed drive train to said power source.

A still further object is to provide in a machine tool having a plurality of slides, mechanism carried by said slides for selecting or preselecting the different rates of feeding movements of the slides and including indexible members, together with dials for indexing the same, which dials are located on their respective slides in such position as to be closely adjacent to each other and within easy simultaneous reach of the operator and in a location wherein the operator may observe both dials in an efficient and convenient manner.

Further and additional objects and advantages not hereinbefore specified will become apparent hereinafter during a detailed description which is to follow of certain embodiments of the invention illustrated in the accompanying drawings wherein.

Figure 1:
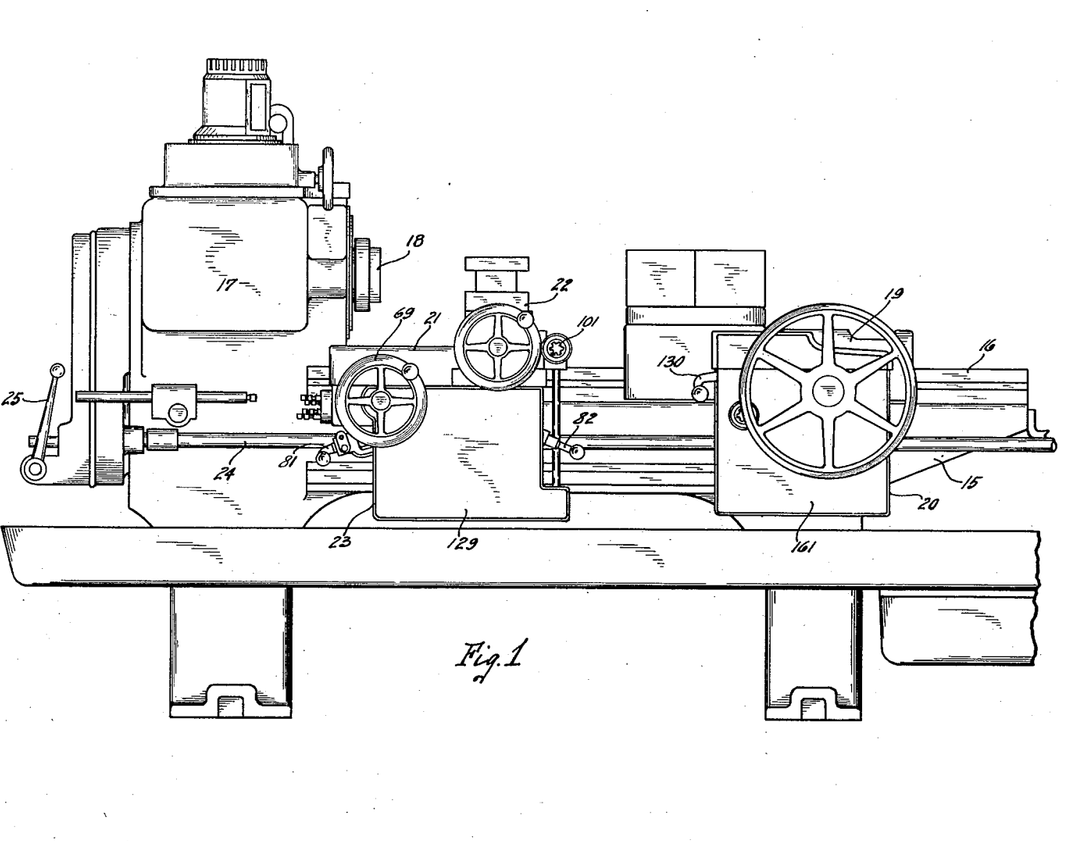
Fig. 1 is a front elevational view of a machine tool to which the invention is applied, and in this instance is a turret lathe provided with a cross-slide carriage and cross-slide, as well as with a turret slide.

Referring to Fig. 1, the invention is shown by way of illustration as applied to a turret lathe and which lathe comprises a bed 15 provided with longitudinally extending ways 16 and having at one end a head 17 in which is mounted the usual work or tool spindle 18 that can be driven at a plurality of different speeds from a power source by suitable change speed gearing arranged in the head as will be well understood.

A turret slide 19 is mounted on the ways 16 of the bed for movement longitudinally thereof and is provided on its front side with an apron 20.

Intermediate the turret slide 19 and the head 17 there is slidably mounted on the ways 16 a cross-slide carriage 21 that has a cross-slide 22 and is provided on its front side with an apron 23.

The turret slide 19, cross-slide carriage 21 and cross-slide 22 are moved for purposes of feeding by means of a power driven feed shaft 24 that extends longitudinally of the front of the bed 15 and is operatively connected at its left hand end, as viewed in the drawings, with the work spindle 18 as is well understood in the art. The operative connection between the said shaft 24 and the work spindle 18 is by means of suitable gearing including shiftable gear elements and a control lever 25 for said elements such that a high speed rotation or a low speed rotation can be imparted to the feed shaft 24 as desired, as is well known in the art.

The feed shaft 24 is operatively connected with the turret slide 19, the cross-slide carriage 21 and the cross-slide 22 by means of suitable drive trains mounted in the turret slide apron 20 and in the cross-slide carriage apron 23, as will also be understood, and which will later be explained more in detail.

Figure 5:
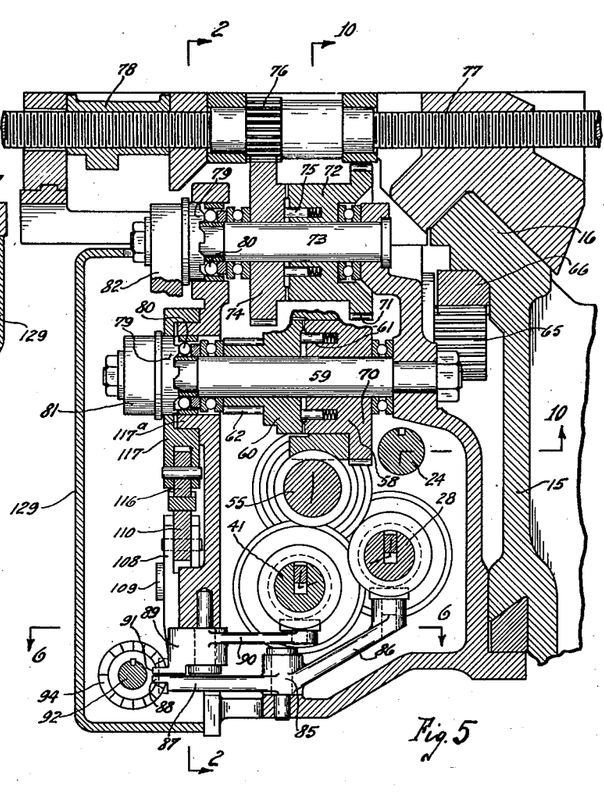
Fig. 5 is a transverse sectional view taken substantially on irregular line 5—5 of Fig. 2, looking in the direction of the arrows.
Figure 10:
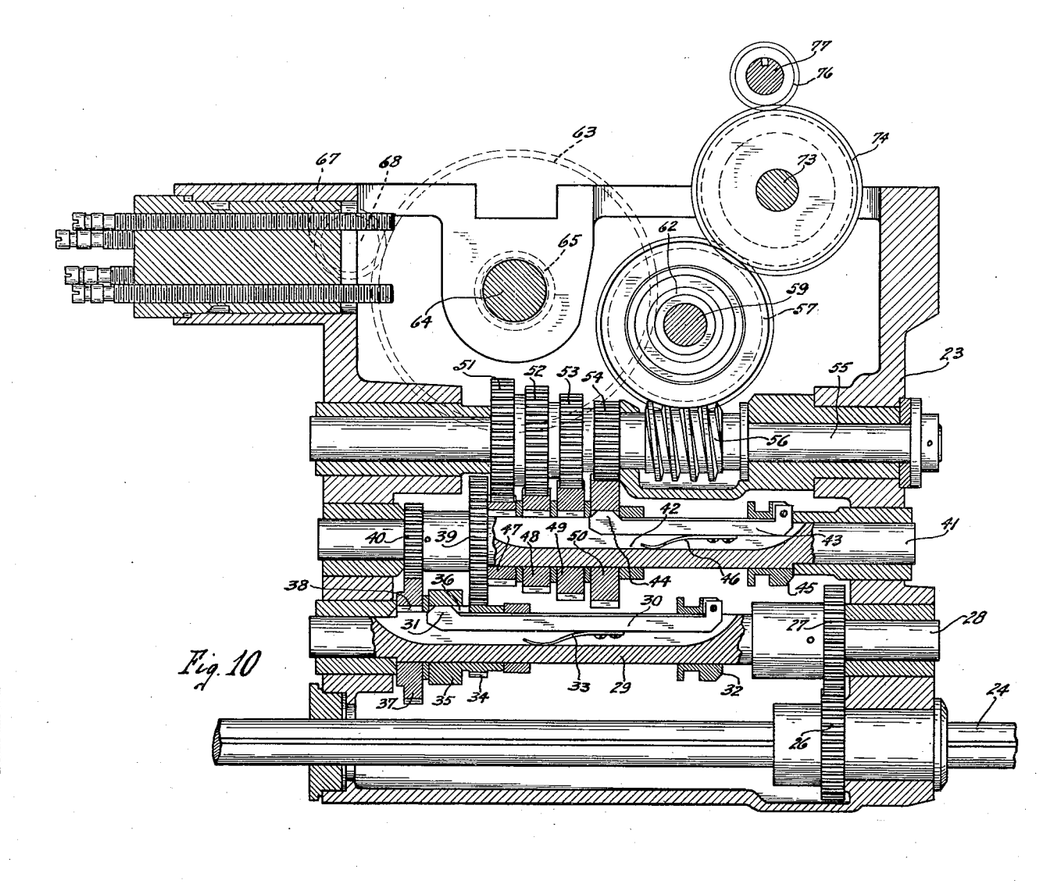
Fig. 10 is a developed and sectional view through the apron of the cross-slide carriage and is taken substantially on irregular line 10—10 of Fig. 5, looking in the direction of the arrows.

Inasmuch as the drive train in the turret slide apron 20 and which operatively connects the turret slide with the feed shaft 24 is a substantial duplicate of the drive train in the apron 23 of the cross-slide carriage 21, when the power drive for the cross-slide is omitted, it will only be necessary to explain herein in detail the drive train in the cross-slide carriage apron 23, and for this purpose reference may be had particularly to Figs. 5 and 10, which latter figure is a developed view of said drive train.

The feed shaft has a splined connection with a rotatable gear sleeve mounted against endwise movement in the apron 23, as is well known in the art, and carrying a gear 26 which meshes with a gear 27 formed on a sleeve that is fixed to a shaft 28 rotatably mounted in suitable bearings in the apron 23.

The shaft 28 is provided with a longitudinally extending slot 29 in which is slidably and rockably mounted a finger 30 that is provided at one of its ends with an oppositely tapered key portion 31, while its opposite end is pivotally connected to a collar 32 that is slidable on the shaft 28. A spring 33 is secured to the underside of the finger 30 and bears against the bottom of the slot 29 and acts to urge the key portion 31 in a direction radially of the shaft 28.

A gear 34 is formed on a sleeve having a collar 35 and which sleeve is mounted on the shaft 28 for free rotation thereon but is held against endwise movement by suitable means as will be well understood. The collar 35 is provided with a key-way 36 into which the key portion 34 of the finger 30 is adapted to project to operatively interconnect the sleeve having the collar 35 and gear 34 with the shaft 28 so that they will rotate with the latter.

A gear 37 larger than the gear 34 is rotatably mounted on the shaft 28 but held against endwise movement thereon by suitable means and this gear is provided with a key-way 38 also adapted to receive the key portion 31 of the finger 30 so that the gear 37 can be operatively connected to the shaft 28 to rotate therewith as a unit.

It will be understood that when the collar 32 is shifted axially of the shaft 28 the finger 30 will also be moved longitudinally of the slot 29 to cause the key portion 31 to be selectively engaged with either the key-way 36 of the collar 35 or with the key-way 38 of the gear 37, as the case may be, to effect a rotation of either the gear 34 or the gear 37 with the shaft 28.

The gears 34 and 37 are constantly intermeshed, respectively, with gears 39 and 40 formed on a sleeve that is fixed to a shaft 41 rotatably supported in suitable bearings located in the apron 23 of the cross-slide carriage. It will be seen that the shaft 41 through the gear 34 or the gear 37 can be connected with the feed shaft 24 so as to have two different speeds of rotation.

The shaft 41 is provided with a longitudinally extending slot 42 similar to the slot 29 in the shaft 28 and in this slot 42 there is slidably mounted a finger 43 like the finger 30 and said finger is provided at one of its ends with an oppositely tapered key portion 44, while its opposite end is pivotally connected to a collar 45 that is slidably mounted on the shaft 41. A spring 46, secured to the finger 43 and located in the slot 42, acts to urge the key portion 44 outwardly in a radial direction with respect to the shaft 41 and into engagement with a key-way formed in each of four gears 47, 48, 49 and 50 rotatably mounted on the shaft 41 but held against endwise movement by suitable means as will be well understood.

It will also be understood that the finger 43 and the key portion 44 can be shifted by the movement of the collar 45 to selectively engage said key portion in one or another of the key-ways in the aforementioned four gears, so that one or the other of the gears 47, 48, 49 and 50 will be operatively connected to the shaft 41 to rotate therewith as a unit.

The gears 47, 48, 49 and 50 are constantly intermeshed respectively with gears 51, 52, 53 and 54 fixed on a shaft 55 that is rotatably supported in suitable bearings in the apron 23. The shaft 55 has fixed thereon a worm 56 which meshes with a worm wheel 57. The worm wheel 57 is either fixed to or made a part of a sleeve 58 that is freely rotatable on a shaft 59 that is arranged transversely of the shaft 55 and extends from the rear to the front of the apron 23 (see Fig. 5).

A sleeve 60 is also freely rotatable on the shaft 59 and can move endwise thereof and this sleeve 60 and the sleeve 58 on their adjacent faces are provided with serrations or clutch teeth which act to clutch the sleeve 58 to the sleeve 60 when the two sleeves are brought together. Spring pressed plungers 61 are mounted in the sleeve 58 and engage with the adjacent face of the sleeve 60 and tend to maintain said sleeves in a separated or disengaged position.

The sleeve 60 has formed thereon a gear 62 which is always intermeshed with a large gear 63 fixed on a shaft 64 mounted in the apron 23 and extending parallel to the shaft 59 and this shaft 64 at its rear end and outwardly of the apron is provided with a pinion 65 in mesh with a rack 66 fixed to the bed 15, wherefore it will be seen when the shaft 64 and pinion 65 are rotated the cross-slide carriage 21 will have movement imparted thereto longitudinally of the ways 16 of the bed.

The gear 63 is also in mesh with a pinion 67 fixed on a shaft 68 arranged parallel to the shaft 64 and projecting outwardly of the front of the cross-slide carriage and having fixed thereto a hand wheel 69, as is well known in the art. The sleeve 58 has formed thereon a gear 70 that meshes with a gear 71 formed on a sleeve 72 freely rotatable on a shaft 73 supported in the apron 23. A gear 74 is freely rotatable on the shaft 73 and can have endwise movement thereon. The adjacent faces of the sleeve 72 and gear 74 are provided with serrations forming clutch teeth, whereby the gear 74 can be operatively clutched to the sleeve 72. The sleeve 72 is provided with spring pressed plungers 75 acting to normally maintain the adjacent faces of the sleeve 72 and gear 74 separated and the clutch teeth disengaged.

The gear 74 is meshed with a wide faced gear 76 formed as part of a sleeve that is splined on the screw shaft 77 which passes through a stationary nut 78 supported in the cross-slide carriage, whence it will be seen that when the gear 76 is rotated the screw 77 will be turned and will have endwise movement imparted thereto by the nut 78, and since the screw 77 is connected in the conventional way to the cross-slide 22 the latter will have feeding movement imparted thereto.

The sleeve 60 on the shaft 59 and the gear 74 on the shaft 73 are cammed into clutching engagement with the sleeves 58 and 72 by means of rockable cam members 79 operating against balls 80. These cam members are rocked by control levers 81 and 82, the former of which controls the engagement and disengagement of the sleeves 58 and 60 to control the longitudinal feeding movement of the cross-slide carriage, while the lever 82 controls the engagement and disengagement of the sleeve 72 and gear 74 to control, in turn, the imparting of feeding movements to the cross-slide.

Figures 2, 3, 4:
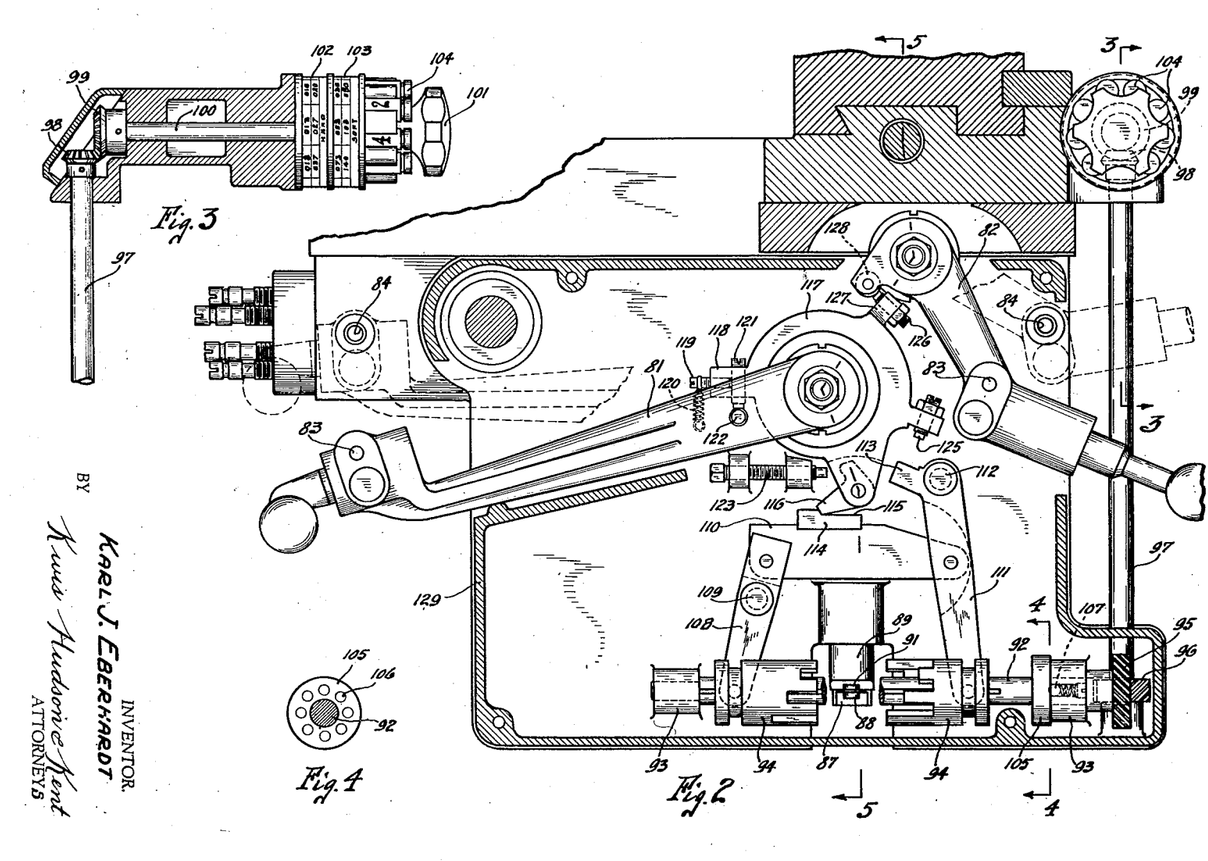
Fig. 2 is a longitudinal vertical sectional view through the cross-slide carriage and apron on a larger scale than Fig. 1 and is taken substantially on line 2—2 of Fig. 5.
Fig. 3 is a detached sectional view through the selecting or preselecting dial mechanism and is taken substantially on line 3—3 of Fig. 2, looking in the direction of the arrows.
Fig. 4 is a detached detail sectional view taken substantially on line 4—4 of Fig. 2, looking in the direction of the arrows.

When the lever 81 is moved from the full line position of Fig. 2 to the dash line position thereof the sleeves 58 and 60 are engaged and longitudinal feeding movement is being imparted to the cross-slide carriage. When the lever 82 is moved from the full line position to the dash line position of Fig. 2 the sleeve 72 and gear 74 are engaged and feeding movement is being imparted to the cross-slide. The levers 81 and 82 are held in their dash line position of Fig. 2, i. e., the engaged or feeding position, by means of spring latches under the control of the rockable handle portions of the levers, as is well understood in the art, and comprising spring pressed pins 83 which engage in recesses or openings 84.

It will be understood that feeding movement of the cross-slide carriage or of the cross-slide is initiated by manually moving the lever 81 or the lever 82 from full line position to the dash line position of Fig. 2 and that such feeding movement can be terminated by disengaging the pins 83 from the recesses 84, either automatically or manually, to allow the levers 81 and 82 to move from the dash line position to the full line position of Fig. 2, which movement would be occasioned in this instance by gravity.

It has already been explained that in this instance eight different rates of feeding movement can be imparted to either the cross-slide carriage or the cross-slide from the feed shaft 24 through the gearing in the apron, and that these different rates of feeding movement can be selectively obtained by shifting the collars 32 and 45 to cause certain of the gears to be operatively coupled to the shafts upon which they are mounted.

The collar 32 on the shaft 28 is shifted by means of a two-arm lever pivoted in the apron at 85 with the arm 86 of this lever carrying at its free end a shoe located in the annular groove of the collar 32, while the arm 87 of this lever is provided at its free end with a finger portion 88, which will be referred to hereinafter.

The collar 45 on the shaft 41 is shifted by means of a rockable sleeve 89 supported in the apron and having a lever arm 90 that is provided at its free end with a shoe located in the annular groove formed in the collar 45. The sleeve 89 is provided with a projecting finger portion 91 similar to the finger portion 88 on the arm 87 of the two-arm lever for shifting the collar 32, it being noted that the finger portions 88 and 91 lie closely adjacent to each other for a purpose later to become apparent.

It will be noted that rocking movement imparted to the two-arm lever and the sleeve 89 will result in endwise movement of the collars 32 and 45 on the shafts 28 and 41, and it will further be noted that the lever arms 87 and 86 are of substantially equal length wherefore any movement imparted to the finger portion 88 will result in substantially the same amplitude of movement being imparted to the collar 32, with the result that the key portion 31 of the finger 30 can be moved sufficiently far to connect or key either the gear 34 or the gear 37 to the shaft 28.

On the other hand it will be noted that the lever arm 90 on the sleeve 89 is substantially four times the length of the finger portion 91, wherefore movement imparted to the finger portion 91 of the same amplitude as the movement imparted to the finger portion 88 will result in moving the collar 45 four times as far as the collar 32 in order that the key portion 44 of the finger 43 can act to key one or the other of the four gears 47, 48, 49 and 50 to the shaft 41.

The finger portions 88 and 91 are moved by the mechanism now to be described and which mechanism serves to select or preselect the different rates of feeding movement to be imparted to the cross-slide carriage or to the cross-slide. It will also be pointed out that said mechanism is operatively connected with the control levers 81 and 82 in such manner that the movement of said control levers not only initiates and terminates the feeding movement of the cross-slide carriage and the cross-slide, but also actuates the selecting or preselecting mechanism to obtain the different rates of feeding movement.

Figure 6:
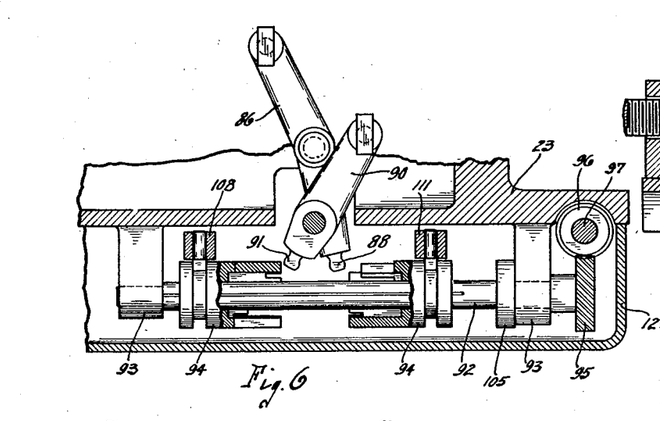
Fig. 6 is a horizontal sectional view taken substantially on line 6—6 of Fig. 5, looking in the direction of the arrows.
Figure 7:
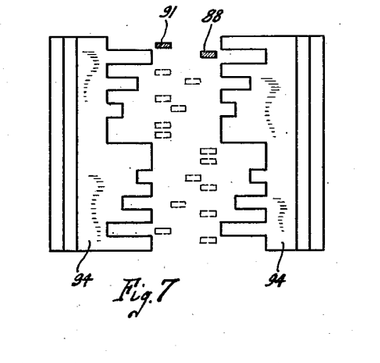
Fig. 7 is a developed view of the indexible members of the selecting and preselecting mechanism shown in the previously referred to views.

A shaft 92 is rotatably mounted in suitable bearings formed in bracket members 93 projecting outwardly from the front face of the apron 23 (see Fig. 6). A pair of spools 94 are splined on the shaft 92 to rotate therewith and move endwise thereof. The spools 94 on their adjacent faces are provided with cooperating series of long and short and short and long projections, as clearly indicated in Fig. 7, which is a developed view of the spools.

The finger portions 91 and 88, previously referred to, are situated intermediate the adjacent faces of the spools 94 and the series of projections thereon, and when said spools are moved lengthwise of the shaft 92 toward each other with an equalized movement the projections on the spools will engage the finger portions 88 and 91 and shift one or the other or both to cause certain of the gears on the shafts 28 and 41 to be keyed to said shafts to effect various rate changes in the drive to the cross-slide carriage and the cross-slide.

It will be seen that the spools 94 if rotated or indexed to eight different positions will bring different pairs of cooperating projections into alignment with the finger portions 88 and 91, wherefore said finger portions can be moved to eight different relative positions to effect the eight different rate changes in the change speed gearing carried in the apron.

The rotation of the shaft 92 and the indexing of the spools 94 can be accomplished when the spools have been moved endwise away from each other to a position wherein the projections are out of engagement with the finger portions 88 and 91, as shown in Figs. 2 and 6, and preferably the indexing will take place when the spools have been moved to their most outward or separated position. The means for moving the spools endwise toward and away from each other with an equalized movement will be explained later following the description which is now to be given of the means for rotating the shaft 92 and indexing the spools.

The shaft 92 has secured on one of its ends a spiral gear 95 which meshes with a similar spiral gear 96 fixed to a vertically extending shaft 97 that is rotatably supported by the apron and the cross-slide carriage and has fixed to its upper end a bevel pinion 98 (see Fig. 3). The bevel pinion 98 meshes with a bevel pinion 99 fixed to a relatively short horizontally positioned shaft 100 that is rotatably supported in a suitable forwardly extending bracket carried by the cross-slide carriage. The shaft 100 has fixed to its outer end a knob 101 for turning the shaft, while arranged intermediate the knob 101 and the outer end of the supporting bracket for the shaft 100 are dials 102, 103 formed on a supporting unit fixed to the shaft 100. This supporting unit on its outer face or end is provided with a series of circumferentially spaced openings located to break through the periphery of the unit and in which are mounted independently rotatable members 104, each bearing indicia corresponding to the different operative steps of a complete work cycle of the machine.

It will be seen that when the members 104 are rotated in the openings, different portions of the circumferences of the members will be brought into view, as will also the different indicia representing the different operative steps of the work cycle.

It will be noted that when the knob 101 is rotated not only will the shaft 92 be rotated to index the spools 94, but also the dials 102, 103 of the unit fixed on the shaft 109 will be turned and the indicia carried by said dials and representing the different rates of feeding movement of the cross-slide carriage and the cross-slide and corresponding to the different indexible positions of the spools will be brought into alignment with a fixed pointer (not shown) mounted on the supporting bracket for the shaft 109.

The shaft 92 has fixed thereto a collar 105 provided with eight circumferentially spaced recesses 106 which can be engaged by a spring pressed ball 107 mounted in one of the bearing brackets 93, wherefore the shaft 92 and the spools 94 will be held in any one of the eight different indexible positions.

The spools 94 are moved endwise on the shaft 92 toward and from each other with an equalized movement by means of the mechanism now to be explained. A short lever 108 is pivotally mounted at 109 on the face of the apron and intermediate the ends of the lever. The lower end of the lever 108 is provided with a pivoted shoe located in the annular groove formed in the left hand spool (see Fig. 6). The upper end of the lever 108 is forkshaped and straddles one end of a link 110 which is pivotally connected to said upper end of the lever 108.

A longer lever 111 is pivotally mounted on the front face of the apron 23 and at its upper end, as indicated at 112. The lower end of the lever 111 is likewise provided with a pivoted shoe that engages in the annular groove in the right hand spool 94 (see Fig. 6). The lever 111 intermediate its ends is recessed to receive the end of the link 110 opposite to the end thereof that is pivotally connected to the lever 108, and said end of the link 110 in turn is pivotally connected to the lever 111.

It will be seen that endwise movement of the link 110 will cause an equalized rocking movement of the levers 108 and 111, with a resultant equalized endwise movement of the spools 94 either toward or away from each other.

The lever 111 at its upper end and adjacent the pivot 112 is provided with a short angularly disposed arm 113, the purpose of which will later be made clear.

The link 110 is provided on its upper side with an actuating block 114 that has its upper edge recessed or cut away, as indicated at 115, to form an inclined shoulder that cooperates with a pivoted pawl 116 for a purpose later to be explained.

When the levers 81 or 82 are in the full line positions of Fig. 2, i. e., clutch disengaged position, the spools 94 are in their outward or indexible position.

The pivoted pawl 116 is carried in a forked portion of a rockable plate 117 that is mounted on a boss 117a formed on the front face of the apron and which plate surrounds the cam member 79 that is operatively associated with the lever 81 (see Fig. 5). The plate 117 is provided on its circumference with a radially extending lug 118 that carries a lock screw 119 to which is attached one end of a spring 120, the other end of which spring is attached to a fixed pin secured in the front face of the apron, wherefore it will be seen that the spring 120 tends to rock the plate 117 in a counter-clockwise direction and to maintain an adjustable abutting screw 121 also carried by the lug 118 in engagement with an abutting pin 122 carried by the lever 81.

It will be noted that movement of the lever 81 from the full line position of Fig. 2 toward the dash line position thereof causes, through the pin 122 and abutting screw 121, a clockwise movement of the plate 117 against the action of the spring 120. The pawl 116 carried by the plate 117 is normally held by gravity in the position indicated in Fig. 2, wherefore such movement of the lever 81 from its full line position toward its dash line position of Fig. 2, with an accompanying clockwise movement of the plate 117, causes the pawl 116 to act on the inclined shoulder of the cutaway edge 115 of the block 114 to move the link 110 endwise and, in the present instance, toward the left, as viewed in Fig. 2. This movement of the link 110 effects an equalized rocking movement of the levers 108 and 111 and, in turn, an equalized endwise movement of the spools 94 toward each other, that is from the position shown in Fig. 2 to the position shown in Fig. 8. At this time the spools 94 will have been brought toward each other such that the projections on the adjacent faces thereof will have cooperated with the pin portions 88 and 91 to effect the selected or preselected movement thereof and, in turn, a change to the selected or preselected gear change.

At this time the lever 81 has not reached the dash line position of Fig. 2, but the upwardly extending arm 116a of the pawl 116 has come into contact with the end of an adjustable abutment screw 123 mounted in suitable brackets formed on the front face of the apron. It will also be observed that the radially projecting lug 124 carried by the plate 117 and provided with an adjustable abutting screw 125 has moved from the position shown in Fig. 2 to the position shown in Fig. 8, at which time it has contacted with the angularly disposed arm 113 of the lever 111. It will be seen, therefore, that further upward movement of the lever 81 toward the dash line position of Fig. 2 now acts to rock the pawl 116 about its pivotal connection with the plate 117 and out of engagement with the actuating block 114 and also causes the abutting screw 125 to rock the long lever 111, with the result that the link 110 is moved endwise toward the right, as viewed in the drawing, and an equalized rocking movement is imparted to the lever 108 with a resultant equalized endwise movement of the spools 94 from the position shown in Fig. 8 to the position shown in Fig. 9. At this time the parts are in the position shown in Fig. 9 as stated, and the lever 81 is in the dash line position of Fig. 2, i. e., the clutch engaged position and the power feeding movement is being imparted to the cross-slide carriage.

It will be seen that inasmuch as the spools are in their separated position they can be indexed by turning of the dial knob 101 if it is desired to preselect the rate of feeding movement for the next operative step of the cycle, or, if it is desired to select the rate of feeding movement for the next operative step of the cycle the dial knob 101 is not rotated to index the spools until the clutch has been disengaged by movement of the lever from the dash line position of Fig. 2 to the full line position thereof.

The latch means formed by the pin 83 and recess 84 and which holds the lever 81 in clutch engaged position may be released either automatically, as is well known in the art, or manually, and upon such release the lever 81 will move by gravity to the full line position of Fig. 2 and the power feed drive to the cross-slide carriage will be disconnected. During this movement of the lever 81 the spring 120 will rock the plate 117 in a counter-clockwise direction and the abutting screw 125 will move away from the short arm 113 of the lever 111, while the pawl 116 will idle over the actuating block 114 and come to rest in the position shown in Fig. 2, and consequently no movement will be imparted to the link 110, levers 108, 111 and spools 94.

As previously stated, the parts have been restored to the position of Fig. 2, and it will be noted that the upward movement of the lever 81 results in first moving the spools inwardly from an indexible position toward each other to a position wherein the levers 90 and 86 are actuated to obtain the selected or pre-selected rates of movement—then the spools are moved outwardly back to the indexible position and the clutch is engaged to initiate the feed drive to the cross-slide carriage, while the movement of the lever 81 in the opposite direction simply results in a disengagement of the clutch and a restoration of the parts to their original position.

When the lever 81 is moved, as just explained, no movement will be imparted to the lever 82, since the adjustable abutting screw 126 carried by the radially projecting lug 127 of the plate 117 moves away from the roller 128 carried by the laterally extending heel portion of the lever 82, as clearly shown in Fig. 2. When it is desired to initiate feeding movement of the cross-slide the lever 82 is moved from the full line position of Fig. 2 to the dash line position thereof, and such movement similarly to the movement of the lever 81, rocks the plate 117 and causes first an inward movement of the spools 94 to bring the projections thereof into shifting engagement with the pin portions 88 and 91, and then an outward movement of the spools to indexing position and an engagement of the clutch to the drive train for the cross-slide. Similarly, the return movement of the lever 82 from the dash line position of Fig. 2 to the full line position thereof, i. e., clutch disengaged position, does not effect any movement of the spools 94 but allows the plate 117 and its associated parts to be restored to the position shown in Fig. 2 by the spring 120.

Figures 8, 9:
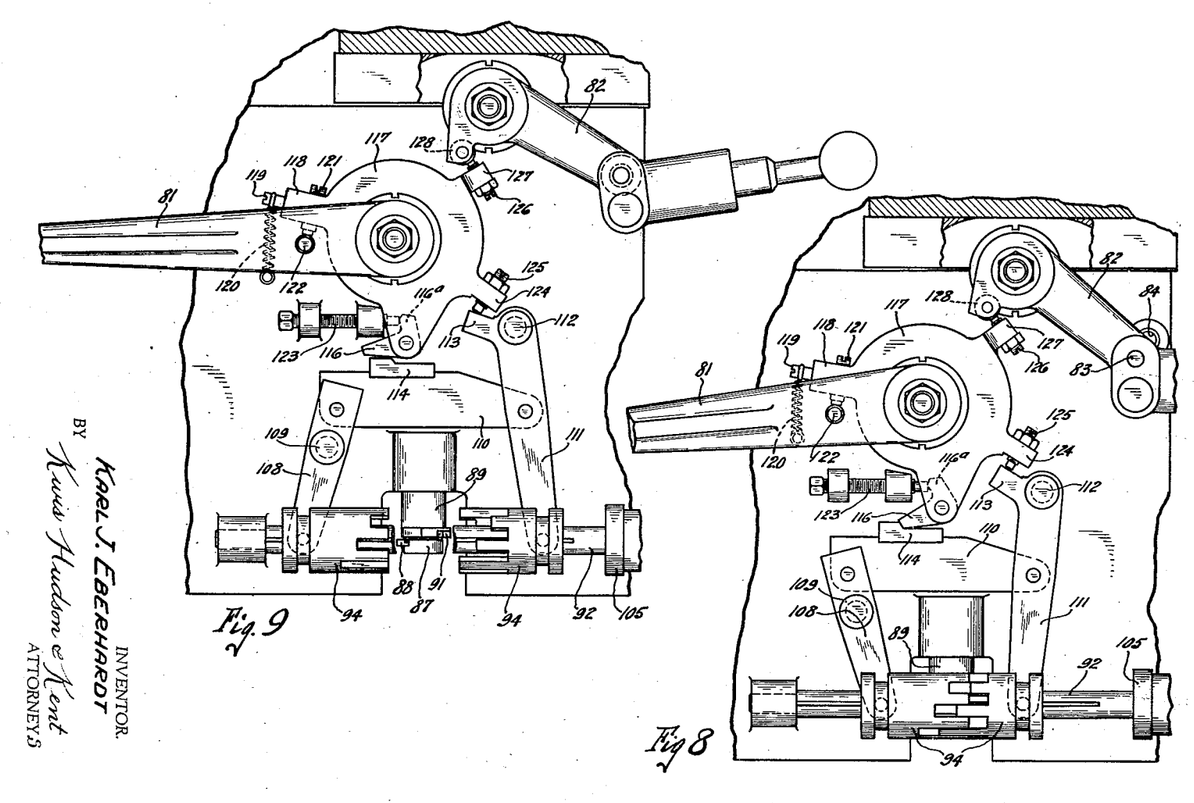
Fig. 8 is a fragmentary view similar to Fig. 2, but showing the parts in a different position.
Fig. 9 is a view similar to Figs. 2 and 8, but showing the parts in a still different position.

For the sake of simplicity and brevity the intermediate position of the lever 82, at which time the spools are in engagement with the pin portions 88 and 91, is illustrated in Fig. 8, while the fully raised or clutch engaged position of said lever, at which time the spools are in indexible position, is illustrated in Fig. 9, but it will be understood that the levers 81 and 82 act independently of each other upon the plate 117 and that movement of one of said levers does not effect any movement of the other of said levers.

The front face of the apron and the parts mounted on the front side thereof are enclosed by a suitable cover member 129, as clearly shown in the drawings, and which cover has cutaway portions through which the levers 81 and 82 extend and have free movement therein as clearly indicated in Fig. 2.

The gearing in the apron 20 of the turret slide 19, as previously mentioned, corresponds to the gearing in the apron of the cross-slide carriage omitting the power drive to the cross-slide and therefore such gearing has not been illustrated herein.

Figure 11:
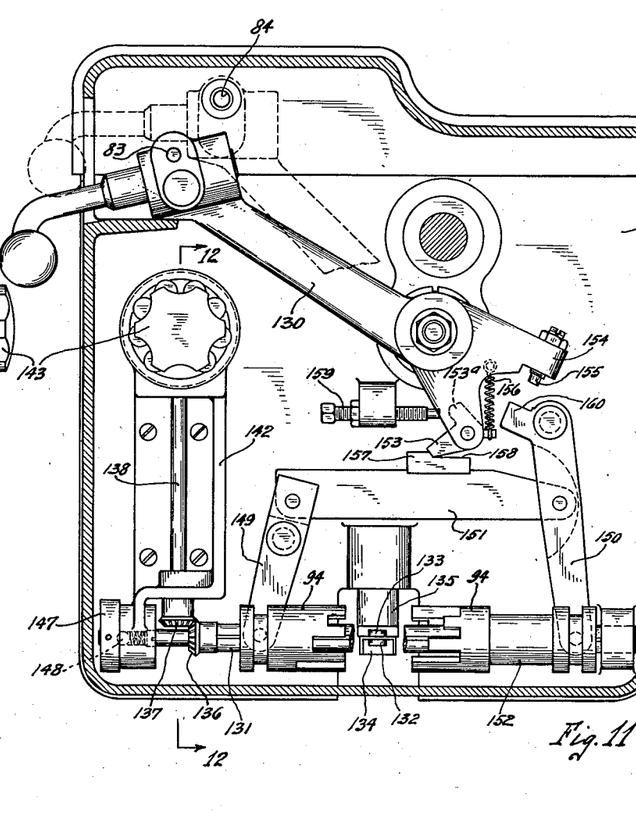
Fig. 11 is a longitudinal vertical sectional view through the apron of the turret slide and shows a slightly different form of selecting or preselecting mechanism than that shown in the apron of the cross-slide carriage.

The change speed gearing in the apron 20 of the turret slide is operatively connected to the drive for the turret slide by clutch means similar to the clutch means disclosed for the same purpose with reference to the cross-slide carriage, and the engagement and disengagement of said clutch means is effected by means of a control lever 130 which, when in the full line position of Fig. 11, effects a disengagement of the clutch and when in the dash line position effects an engagement of the clutch.

A shaft 131 is rotatably mounted in suitable bearings on the front side of the apron and this shaft has splined thereon to rotate therewith and move endwise thereof similar spools 94 which, as explained for the cross-slide carriage, are provided on their adjacent faces with series of cooperating projections. These projections cooperate with finger portions 132 and 133 of the pivoted levers 134 and 135 that effect sliding movement of the two and four position sliding keys corresponding to the keys 30 and 43 described in connection with the gearing in the apron of the cross-slide carriage.

It will be seen that when the spools 94 are moved endwise toward each other on the shaft 131 and into engagement with the finger portions 132 and 133, said levers 134 and 135 will be rocked and said sliding fingers shifted to effect gear changes in the change speed drive carried in the apron.

Figure 12:
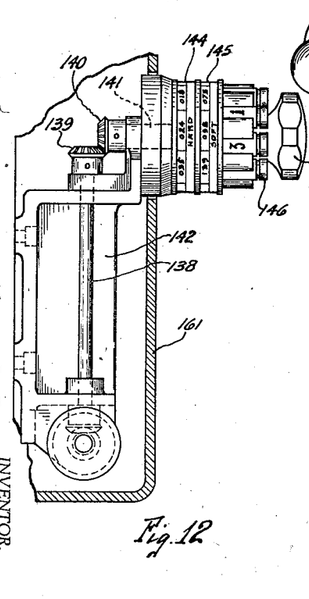
Fig. 12 is a sectional view through the selecting and preselecting dial mechanism shown in Fig. 11 and is taken on line 12—12 thereof looking in the direction of the arrows.

When the spools 94 have been moved outwardly out of engagement with the finger portions 132 and 133 and into indexible position, as shown in Fig. 11, the shaft 131 can be rotated to index the spools by the following mechanism: The shaft 131 to the left of the spools, as viewed in Fig. 11, is provided with a bevel pinion 136 that meshes with a similar bevel pinion 137 fixed to the lower end of a vertically extending shaft 138, the upper end of which has fixed thereto a bevel pinion 139 (see Fig. 12). The bevel pinion 139 meshes with a similar bevel pinion 140 fixed on the inner end of a horizontally extending shaft 141 that is rotatably mounted in a suitable supporting bracket 142 carried by the front face of the apron, which bracket also is provided with the bearings for the shaft 138. The shaft 141 has fixed thereto at its outer end an operating dial knob 143 and a unit including cylindrical dials 144 and 145 and independently indexible members 146 carried by the front end of the unit and corresponding to the members 104 previously explained.

It will be seen that rotation of the dial knob 143 will effect a corresponding rotation of the shaft 131 and an indexing rotation of the spools 94. The shaft 131 to the left of the bevel pinion 136 is provided with a reduced portion that extends through a bearing formed in the part of the bracket 142 and has fixed at its outer end a collar 147 which is provided with eight equally spaced recesses corresponding to the recesses 106 in the collar 105 as previously explained and as shown in Figs. 2 and 4. The bearing for the reduced portion of the shaft 131 carries a spring pressed pawl 148 which will engage in any one of the recesses to hold the shaft and the spools 94 in different indexed positions.

The mechanism for imparting equalized endwise movement to the spools toward and from each other includes pivoted levers 149 and 150 corresponding, respectively, to the pivoted levers 108 and 111 and connected to the spools 94 and to a link 151 in the same way as the levers 108 and 111 are connected to the spools 94 and link 110. It will be noted, however, that the link 151 is longer than the link 110 and this difference is necessitated because of the different pivotal location of the lever 130 on the front of the apron from the location of the pivotal connection of the lever 81. It will also be noted for the same reason that the right hand spool 94, as viewed in Fig. 11, is provided on its right hand side with an elongated sleeve 152 that has the annular groove formed therein with which the lever 150 is connected.

The rockable plate 117 is omitted in the mechanism carried by the apron of the turret slide and the pawl 153, corresponding to the pawl 116, as well as the projection 154 which carries the abutting screw 155 corresponding to the abutting screw 125, are mounted or formed directly on the lever 130. The pawl 153 is normally held in the position shown in Fig. 11 by means of a spring 156, one end of which is connected to a pin projecting from the pawl and the other end of which is connected to a pin carried by the lever 130. The pawl cooperates with an actuating block 157 similar to the block 114 and provided with a cut out upper edge 158 corresponding to the edge 115 of the block 114. An adjustable abutting screw 159 is carried by the front face of the apron and this screw corresponds in function to the screw 123 in that upward movement of the lever 130 brings the angular arm 153a into engagement with the end of said screw to rock the pawl out of engagement with the actuating block 157 so that during further upward movement of the lever 130 motion is not imparted to the link 151 by the pawl 153. At the time that the pawl 153 is rocked out of engagement with the block 157 the abutting screw 155 is in contact with the angularly disposed arm 160 of the lever 150, with the result that the continued upward movement of the lever 130 to dash line position of Fig. 11 effects, through the lever 150, link 151 and lever 149 an outward endwise movement of the spools 94 back to indexing position.

It will be understod, of course, that when the lever 130 is in the dash line position of Fig. 11 the clutch controlling the feed drive to the turret slide is engaged. It will also be understood that the rockable handle portion of the lever 130 is provided wth a spring pressed latch pin 83 that engages in the recess 84 to hold the lever 130 in its upward or clutch engaged position in the same way as the levers 81 and 82 are so held. The latch pin 83 may be automatically or manually released to allow the lever 130 to move from dash line or clutch engaged position to the full line or clutch disengaged position of Fig. 11 and such movement of the lever simply results in the pawl idling over the block 157 until it reaches the position shown in Fig. 11 and in the abutting screw 155 moving away from the arm 160 of the lever 150, whereby it will be seen that no endwise movement is imparted to the spools 94 when the lever 130 moves from clutch engaged to clutch disengaged position, but that the parts associated with the lever are restored to their original position.

The lever 130 and the other parts carried by the front side of the apron 20 are enclosed within a cover member 161 having openings through which the lever 130 and the dial knob 143 and its associated parts can project and be operated. It will be noted that the dial knob 143 is located on the left side of the apron 20 in a position where it can be operated and observed along with the dial knob 101 that is located at the right side of the cross-slide carriage.

It will be seen from the foregoing description that the movements of the control levers 81, 82 for the cross-slide that the movements of the control levers 81, 82 for the cross-slide carriage and the cross-slide, as well as the movement of the control lever 130 for the turret slide result, when moved in one direction, in first moving the spools from an indexible position to a position to effect the rate changes, and then back to an indexible position and also effect an engagement of the respective clutches, while the movement of said levers in the opposite direction simply effects a disengagement of the respective clutches without causing any change or movement in the spools.

It will also be noted from the foregoing description that the dial knobs 101 and 143 can be rotated to index the spools to either select or preselect the different rates of feeding movement for the cross-slide carriage, cross-slide and turret slide, since the spools are in the indexible position both when the control levers are in clutch engaged position or in clutch disengaged position.

It will also be understood that when the rates of feeding movement are preselected the spools are indexed during the clutch engaged position of the lever or levers while the cross-slide carriage, cross-slide or turret slide is feeding during one operative step of the work cycle and the preselected rates of movement are obtained when the current feeding movement has trminated and the lever or levers have been moved to clutch disngaged position and then back to clutch engaged position to initiate the feeding movement for the next operative step in the work cycle.

It will also be understood that when the rates of feeding movement are selected the spools are not indexed until the control levers have moved to clutch disengaged position and the preceding operative step of the cycle has been terminated.

Although preferred forms of the invention have been illustrated and described herein it will be understood that the invention is susceptible of various modifications and adaptations within the scope of the appended claims.

Having thus described my invention what I claim is:

1. In a machine tool having a movable part, a power source, mechanism for connecting said part and said power source and including a clutch, a control lever therefor and change speed means, means operatively associated with said mechanism and including a member indexible to select or preselect the different rates of movement of said part and movable to actuate said change speed means to obtain the selected or preselected rate, and means operatively connecting said member with said control lever such that movement of said control lever from clutch disengaged position toward clutch engaged position first effects a movement of said member from an indexible position into a position to effect a rate change to the selected or preselected rate, then effects a movement of said member back to the indexible position while effecting an engagement of said clutch.

2. In a machine tool having a movable part, a power source, mechanism for connecting said part to said power source and including a clutch, a control lever therefor and change speed means, means operatively associated with said mechanism and including a member indexible when in a predetermined position to select or preselect the different rates of movement of said part and movable from said position to actuate said change speed means to obtain the selected or preselected rates of said part, and means operatively associating said member with said control lever such that said member is in the indexible position when said lever is in either clutch engaged or clutch disengaged position while movement of said lever from clutch disengaged to clutch engaged position effects a movement of said member from indexing position to actuating position and then back to indexing position.

3. In a machine tool having a movable part, a power source, mechanism for connecting said part with said power source and including a clutch and change speed means for imparting different rates of movement to said part, means operatively associated with said mechanism and including a member indexible when in a predetermined position to select or preselect the different rates of movement of said part and movable from indexing position to an actuating position to obtain the selected or preselected rates of movement, a control lever for said clutch and said member, and means operatively connecting said lever with said clutch and said member such that when said lever is in clutch engaged position or clutch disengaged position said member is in indexible position, while movement of said lever in one direction moves said member from indexing position to actuating position and back to indexing position.

4. In a machine tool having two movable parts, change speed means for changing the rates of movement of said parts, clutches for connecting said parts with said change speed means, control levers for said clutches, mechanism operatively associated with said change speed means and said control levers and including a member indexible in a predetermined position to select or preselect the different rates of movement for one or the other of said parts, and movable from indexing position to actuating position to obtain the selected or preselected rate of movement for said part, and means operatively connecting said member and said control levers such that movement of one or the other of said control levers in one direction moves said member from indexing position to actuating position and back to indexing position.

5. In a machine tool having a pair of movable parts, change speed means for moving said parts at different rates of movement, separate means for connecting said change speed means with said parts, control levers for said separate means, and mechanism operatively associated with said change speed means and said control levers and including a member indexible when in a predetermined position to select or preselect the different rates of movement of said parts and movable from said indexing position to actuating position to obtain the selected or preselected rates of movement for said part, and means operatively connecting said member with said control levers such that movement of the latter in one direction effects a movement of said member from indexing position to actuating position and back to indexing position.

6. In a machine tool having two movable parts, change speed means for changing the rates of movement of said parts, separate clutch means for connecting or disconnecting said parts and said change speed means, control levers for said separate clutch means, mechanism for controlling said change speed means and including a member indexible when in a predetermined position to select or preselect the different rates of movement for said parts and movable to an actuating position to obtain the selected or preselected rates, and an operative connection between said member and said levers for effecting movement of said member from indexing position to actuating position and back to indexing position and including means movable by either of said levers when the latter are moved in one direction but inactive when said levers are moved in the opposite direction.

7. In a machine tool having a movable part, change speed means for moving said part at different rates of movement, mechanism operatively associated with said change speed means and including a member indexible when in a predetermined position to select or preselect the different rates of movement of said part, and means for moving said member from indexible position to an actuating position to obtain the selected or preselected rate of movement and back to indexing position and including an operating member movable in one direction to effect said movement of said first-named member, a pair of control levers, and means operatively associating said levers with said operating member such that movement of either of said levers in one direction effects the operative movement of said operating member.

8. In a machine tool having a movable part, change speed means for moving said part at different rates of movement, and mechanism operatively associated with said change speed means and including a member indexible when in a predetermined position to select or preselect the different rates of movement of said part and movable from indexing position to an actuating position to obtain the selected or preselected rate of movement, and means for moving said member and including an operating member having means associated therewith and effective during movement of said operating member in one direction to effect a movement of said first named member from indexing position to actuating position and a second means operatively associated with said operating member and effective upon a continuation of the movement thereof in one direction to move said first named member from actuating position back to indexing position, and means for automatically moving said operating member in the opposite direction to restore the same and the means associated therewith to their original positions.

9. In a machine tool having a movable part, change speed means for moving said part at different rates of movement, mechanism operatively associated with said change speed means and including a member indexible when in a predetermined position to select or preselect the different rates of movement of said part, and means operatively associated with said member and including an operating member provided with separate operating elements, one of which is effective upon movement of said operating member to cause movement of said first named member from indexing position to an actuating position to obtain the selected or preselected rate, and the other of which is effective to cause movement of said first named member from actuating position to indexing position, and means for automatically rendering said first named element inactive when said second named element becomes active.

10. In a machine tool having a movable part, change speed means for moving said part at different rates of movement, and mechanism operatively associated with said change speed means and including a member indexible when in a predetermined position to select or preselect the different rates of movement of said part and movable from indexing position to an actuating position to obtain the selected or preselected rate of movement, and means for moving said member and including an operating member having means associated therewith and effective during movement of said operating member in one direction to effect a movement of said first named member from indexing position to actuating position, and a second means operatively associated with said operating member and effective upon a continuation of the movement thereof in said one direction to move said first named member from actuating position back to indexing position, a lever, and means operatively connecting said lever and said operating member such that movement of the lever in one direction effects said hereinbefore mentioned movement of said operating member, and means for automatically moving said operating member in the opposite direction independently of said lever to restore the said operating member and the means associated therewith to their original positions.

11. In a machine tool having a movable part, change speed means for moving said part at different rates of movement, and mechanism operatively associated with said change speed means and including a member indexible when in a predetermined position to select or preselect the different rates of movement of said part and movable from indexing position to an actuating position to obtain the selected or preselected rate of movement, and means for moving said member and including a lever provided with means effective during movement of said lever in one direction to effect a movement of said member from indexing position to actuating position, said lever also being provided with a second means effective upon a continuation of the movement of the lever in said one direction to move said member from actuating position back to indexing position.

12. In a machine tool having a movable part, a power source, mechanism for connecting said part and said power source and including a clutch, a control lever therefor and change speed means, means operatively associated with said mechanism and including members indexible when in a predetermined position to select or preselect the different rates of movement of said part and movable from said position to actuating position to obtain the selected or preselected rate, and means operatively connecting said members with said control lever such that movement of said control lever from clutch disengaged position toward clutch engaged position first effects a correlated movement of said members from indexible position into actuating position and then back to the indexible position while effecting an engagement of said clutch.

13. In a machine tool having a slide provided with an apron, change speed means for moving said slide at different rates of movement and mounted in said apron, means for shifting the shiftable elements of said change speed means and extending beyond the front wall of the apron, mechanism operatively associated with said last named means and supported on the front face of the front wall of the apron and including a member indexible to select or preselect the different rates of movement of said slide and movable to actuate said last named means to shift the shiftable elements of the change speed means to obtain the selected or preselected rate, a control lever, and means operatively connecting said lever with said member in such manner that movement of the lever effects a movement of said member from the indexible position into a position to effect the rate change and back to the indexible position.

14. In a machine tool having a bed, a pair of slides movable on said bed and each provided with an apron, change speed means supported in each apron for moving the respective slides at different rates of movement, mechanisms operatively associated with said change speed means and each including members indexible to select or preselect the different rates of movement of the respective slides and movable to actuate said change speed means to obtain the selected or preselected rate of movement, and means for indexing said members and including a pair of indexing and indicating dials, said dials being accessible from the front of the aprons and located near adjacent ends of the respective slides whereby both dials are within easy reach of the operator.

15. In a machine tool having a movable part, a power source, means for connecting said part and said power source and including a clutch and change speed means, a control lever for said clutch, mechanism operatively associated with said change speed means and including members indexible when in a predetermined position to select or preselect the different rates of movement of said part, means for moving said members from indexing position to an actuating position to obtain the selected or preselected rate and including a pair of actuating levers interconnected by a link, an operating member provided with an element cooperating with said link when said operating member moves in one direction to move said link and levers to effect a movement of said members to actuating position, said operating member also being provided with a second element effective upon a continuation of the movement in said one direction and cooperating with one of said levers to move said link and levers and said members from actuating position back to indexing position, and means operatively associating said control lever with said operating member such that movement of said control lever in one direction effects the said movement of said operating member in said one direction.

16. In a machine tool a movable part and mechanism for controlling the movement of said part and including members movable toward and away from each other, means for moving said members toward and away from each other and including a pair of actuating levers interconnected by a link, and an operating member provided with separate elements one of which during movement of said operating member cooperates with said link to move said members in one direction and the other element of which during movement of said operating member cooperates with one of said levers to move said members in the opposite direction.

17. A structure such as specified in claim 16 characterized by the provision of two independent levers each of which is operatively associated with said operating member to effect movement thereof.

18. A structure as defined in claim 16 characterized in that the element of the operating member which cooperates with the link is movable relative to said operating member and means is provided for moving said element relative to said operating member and out of cooperation with said link upon a predetermined movement of said operating member.

19. A structure as defined in claim 18 and wherein the second element of the operating member is fixed with respect thereto.

20. A structure as defined in claim 18 characterized in that the movable element of the operating member is inactive during the movement of said member in one direction.

21. In a machine tool having a movable part, change speed means for moving said part at different rates, mechanism operatively associated with said change speed means and including members indexible when in a predetermined position to select or preselect the different rates of movement of said part, means for moving said members from indexing position to an actuating position to obtain the selected or preselected rate and including a pair of actuating levers interconnected by a link, an operating member provided with an element cooperating with said link when said operating member moves in one direction to move said link and levers to effect a movement of said members to actuating position, said operating member also being provided with a second element effective upon a continuation of the movement in said one direction and cooperating with one of said levers to move said link and levers and said members from actuating position back to indexing position, and a control lever operatively associated with said operating member such that movement of said control lever in one direction effects the said movement of said operating member in said one direction.

22. In a machine tool having a movable part, change speed means for moving said part at different rates, mechanism operatively associated with said change speed means and including members indexible when in a predetermined position to select or preselect the different rates of movement of said part, means for moving said members from indexing position to an actuating position to obtain the selected or preselected rate and including a pair of actuating levers interconnected by a link, a control lever for said mechanism and having an integral portion provided with an element cooperating with said link when said control lever moves in one direction to move said link and levers to effect a movement of said members to actuating position, said integral portion also being provided with a second element effective upon a continuation of the movement of the control lever in said one direction and cooperating with one of said actuating levers to move said link and levers and said members from actuating position back to indexing position.

KARL J. EBERHARDT.